April 5, 1966        L. McGIHON        3,244,268
FRUIT FEEDER
Original Filed July 19, 1962
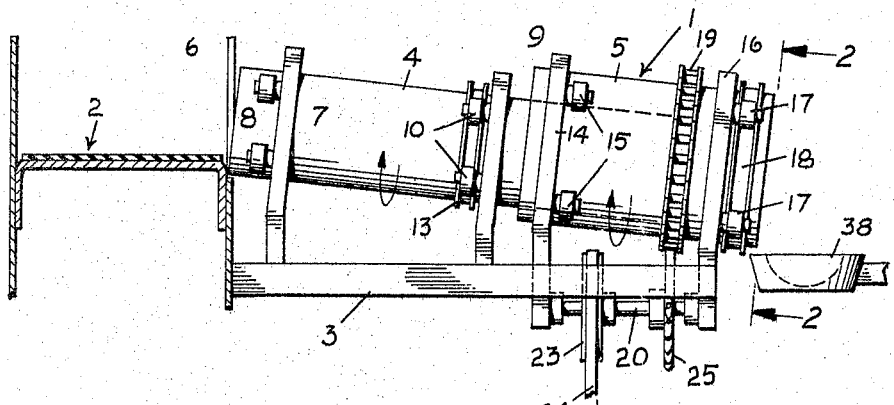
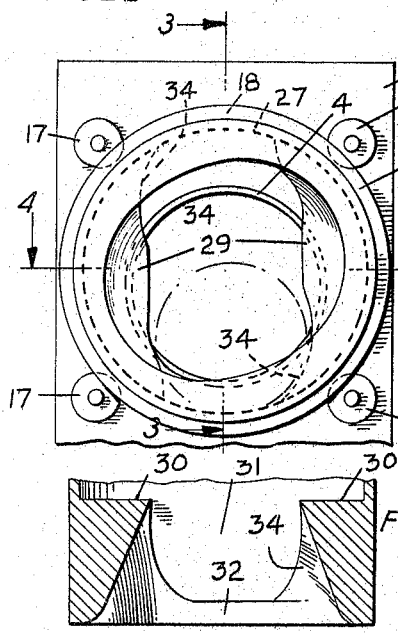
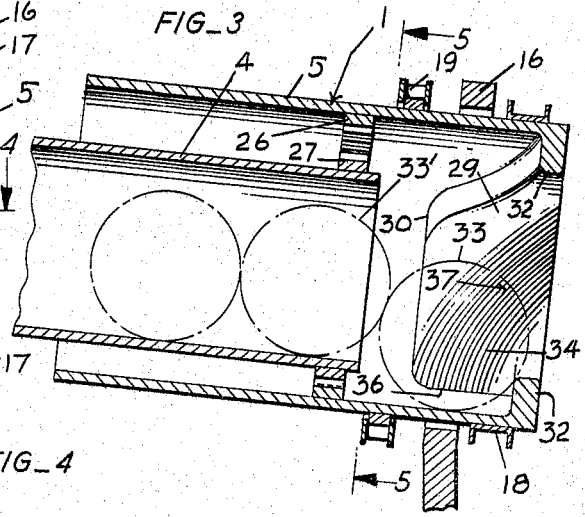
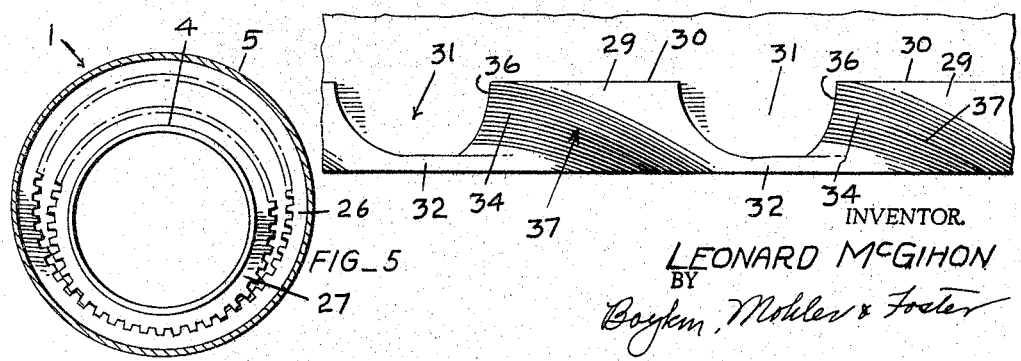
INVENTOR.
LEONARD McGIHON
BY
Boykin, Mohler & Foster
ATTORNEYS

United States Patent Office 3,244,268
Patented Apr. 5, 1966

3,244,268
FRUIT FEEDER
Leonard McGihon, San Leandro, Calif., assignor to Filper Corporation, San Ramon, Calif., a corporation of California
Continuation of abandoned application Ser. No. 211,070, July 19, 1962. This application Apr. 26, 1965, Ser. No. 453,549
7 Claims. (Cl. 198—34)

This application is a continuation of application Serial No. 211,070, filed July 19, 1962, and the invention described therein and relates to a feeder of generally the type shown in copending application of George E. Kilner and Leonard McGihon, Serial No. 179,552, filed March 14, 1962 and has for one of its objects the provision of a simple, economically made means for intermittently feeding fruit, one at a time, and at uniform intervals of time, from a discharge point.

In many operations in the fruit canning, handling and processing operations, there are machines that require the delivery of fruit to a point, one at a time, at uniform intervals of time. Several examples are the pitting of peaches and other drupes, and the coring and peeling of pears and apples. In the vegetable processing field examples occur, hence the use of the word "fruit" is intended to be inclusive of such vegetables and other objects as may be fed by the present machine.

The articles that are particularly capable of being fed by the present method and machine, are such articles as are rollable within a tube that is inclined relative to horizontal from the elevated end thereof to the lower end upon rotating the tube about its axis. The fruit already mentioned are examples in the fruit industry.

An object of the invention is to provide means that cause the rollable fruit bodies to be fed to a discharge point, and at said point to be intermittently discharged, one at a time, at uniform time intervals without injury to the fruit, and which means is substantially free from moving parts other than a pair of relatively rotatable cylinders, and that is also free from complicated expensive structure, yet which means is rugged, dependable, and economical to install, operate and to maintain.

Other objects and advantages will appear in the description and in the drawings.

In the drawings:

FIG. 1 is a reduced size side elevational view of the feeder, including a means for delivering fruit or rollable articles to the receiving end of the feeder and a means for receiving the fruit discharged from the feeder.

FIG. 2 is an enlarged end elevational view of the feeder at the discharge end thereof as seen from line 2—2 of FIG. 1.

FIG. 3 is a fragmentary, cross sectional view taken along line 3—3 of FIG. 2. The dot-dash lines in the figure designate the articles to be discharged or fed from the device.

FIG. 4 is a fragmentary, cross sectional view taken along line 4—4 of FIG. 2.

FIG. 5 is a cross sectional view taken along line 5—5 of FIG. 3.

FIG. 6 is a plan view of the inside of the cylindrical end of the feeder opened flat to show the structure.

Referring to FIG. 1 the feeder, generally designated 1, extends slantingly downwardly from a conventional belt conveyor 2 on which articles or fruit may be carried in bulk, in indiscriminate arrangement. If desired, any suitable means may be positioned over the belt to deflect fruit into the feeder but, in any event, only one fruit body at a time can enter the feeder.

A frame 3 may support the feeder in its inclined position relative to the conveyor, which frame may be supported on, or from, the conveyor support or in any other suitable manner.

The feeder itself comprises an upper cylinder 4 and a lower cylinder 5, the latter being of greater diameter than the cylinder 4, and into which lower cylinder 5 the lower end of the upper cylinder 4 projects.

The words "upper" and "lower" are used relative to the inclined position of the feeder. The upper cylinder 4 is at the upper end of the incline while the cylinder 5 is at the lower end. However, the lower cylinder might also be called an "outer" cylinder because it is outside the cylinder 4.

Cylinders 4, 5 are not steeply inclined, and their axes are preferably parallel, although not coaxial, since the axis of the cylinder 4 is below the axis of cylinder 5. Hence the cylinders are eccentrically positioned relative to each other with the lower sides of the cylinders relatively close together as distinguished from their upper sides. Each cylinder is of substantially uniform diameter from end to end, and there is no obstruction within cylinder 4 to the free movement of articles therethrough.

The cylinder 4 is substantially longer than the cylinder 5 and projects a substantial distance out of the upper end of cylinder 5, and to the belt 2, the lower edge of the cylinder 4, at its upper end, being preferably slightly below the edge of the belt that is adjacent thereto so that articles rolling along the side wall 6 of the conveyor support will roll freely into the upper open end of the cylinder 4 upon reaching the latter. Said wall 6 is provided with an opening to permit such articles free access to the upper open end of the cylinder 4.

A vertically extending support 7 adjacent to the upper end of cylinder 4 is carried by frame 3. This support may be a plate formed with an aperture through which the upper end of the cylinder 4 freely extends, and which is provided with four rollers 8 that support the upper end of the cylinder 4 for rotation about its axis.

A similar vertically extending support 9 is provided around cylinder 4 adjacent to the point where the latter enters the lower cylinder 5, only the rollers 10 on this support may run in an annular outer, outwardly opening channel member 13 that is rigid on the cylinder. Thus the cylinder will be supported against axial movement while being supported for rotary movement.

The lower cylinder 5 may be supported for rotation by means similar to that employed for supporting the cylinder 4. An upper support 14 adjacent to the upper end of cylinder 5 carriers rollers 15 that rotatably support the upper end of the cylinder 5, while a vertically extending support 16 carries rollers 17 that, in turn, run in an outwardly opening annular channel 18 secured on cylinder 5 adjacent to its lower end (FIG. 2) for both rotatably supporting the lower end of cylinder 5, and for holding said cylinder against axial movement thereof during its rotation.

These supports 14, 16 are also carried on frame 3, and these supports, including supports 7, 9 support the cylinders 4, 5 in their desired relationship with their axes substantially parallel.

Adjacent to the lower end of the cylinder 5, and between supports 14, 16, but closer to the support 16, is an annular sprocket chain 19 that encircles and is rigid with the cylinder 5.

The plates or supports 14, 16 may have downward extensions that are journalled to rotatably support the ends of a horizontal shaft 20 positioned centrally below the cylinder 5.

This shaft carries a pulley 23 that is connected by a belt 24 with any suitable source of power, such as a motor or a pulley on a motor driven shaft, in generally the same manner as in the feeder in said copending application.

Also secured on shaft 20 is a sprocket wheel 25, the teeth of which are in mesh with the links of the sprocket chain 19 that is secured around and to the cylinder 5. Thus upon rotation of the shaft 20 the cylinder 5 will be rotated.

Within the cylinder 5 and secured thereto is an annular internal gear 26 coaxial with said cylinder, the radially inwardly directed teeth of which are in mesh with the teeth on a gear 27 that is secured on and around the end of cylinder 4 that projects into the cylinder 5 (FIGS. 3, 5). Thus upon rotation of the cylinder 5 in one direction the cylinder 4 will be rotated in the same direction, but at a higher rate of speed. This rotation of the cylinder 4 will cause the fruit, such as apricots, peaches, pears, etc., to roll down the interior of cylinder 4 and out of the lower end thereof.

The lower end of cylinder 4 terminates within the cylinder 5 at a point spaced from the lower end of the latter a distance slightly greater than the maximum diameter of the fruit to be fed by the device. Thus the cylinder 5 projects beyond the cylinder 4.

Formed on the radially inwardly facing side of the projecting lower end of cylinder 5 is a radially inwardly projecting portion of irregular cross sectional contour, both transversely and longitudinally of the cylinder, but the remainder of the inside surface of cylinder 5 is of uniform diameter.

The radially inwardly projecting portion of cylinder 5 within its lower end is continuous, circumferentially of the cylinder at the terminating lower end of cylinder 5. This continuous portion has a pair of axially extending projections 29 extending into the cylinder 5 toward the terminating lower end of cylinder 5, and axially facing annularly extending shoulders or faces 30 on these projections are directed toward the cylinder 4, while the spaces between projections 29 form pockets 31 that open toward cylinder 4. The ends of these pockets 31 that are adjacent to the lower end of cylinder 5 are closed by the walls 32 that extend between the ends of the pockets opposite to their open ends.

The distance between the bottom 32 of each pocket 31 and the lower end edge of cylinder 4 is such that a fruit body 33 (dot-dash line in FIG. 3) that is in a pocket 31 will be held by the portion 32 in a position in which the next fruit body 33' that is at the discharge end of cylinder 4 will be held by body 33 within the lower end of said cylinder, in which position it cannot become jammed with body 33', even in those circumstances where the normal variations in the diameters of the fruit occurs. The internal diameter of cylinder 4 is substantially less than double the diameter of the fruit bodies that are being fed by the feeder.

Assuming the cylinder 5 is being rotated clockwise (FIGS. 2, 3), the circumferentially facing leading side 34 of each recess 31 tapers from edge 36 that is at the inside surface of cylinder 5 to the maximum radial thickness of each projection 29, but this is a compound taper, since the thickened portion 29 is also tapered axially of the cylinder generally in a direction outwardly of cylinder 5 away from the axis of the cylinder to form a pair of generally spirally extending channels 37 (FIG. 6) that respectively extend from said leading edges 36 at one side of each pocket 31, and across the continuations (circumferentially of the cylinder) of the bottom or lower ends 32 of pockets 31, and out of the lower open end of cylinder 4.

Space holders 38 of conventional orienting machines, pitters, corers and the like, may successively move past the lower end of the cylinder 4 in uniform predetermined time intervals, and the cylinder 5 is rotated in timed relation to such holders 38 so that a fruit unit 33 will roll along the lowermost spirally extending channel 37 and out of the lower end of the cylinder 4 and into such holder, as each such holder moves past said lower end.

Emphasis is placed on the fact that the structure substantially as described, and in which the fruit bodies roll on spirally extending surfaces out of the cylinder 5 rather than in helically extending paths on surfaces that are coextensive and coaxial with the inner surface of the cylinder 5, ensures the successive, accurately timed discharge of fruit bodies of different diameters free from jamming in the cylinder 5.

It is obvious that the time interval between discharge of fruit may be readily regulated according to the rate of rotation of cylinder 5. Also the tilt of the cylinders may readily be varied or adjusted to effect movement of the fruit down the cylinder 4 at the desired rate of speed, the degree of tilt and the rate of rotation of the cylinder 4 will both affect the rate at which the fruit rolls down cylinder 4.

Independently of the particular apparatus disclosed, the method that is practiced may be described as one in which the rollable fruit bodies are moved under the influence of gravity in substantially single file in one direction extending longitudinally of said file within an enclosed horizontally extending path of travel with the bodies of adjacent pairs thereof in engagement with each other and substantially in such engagement adjacent to a point of discharge from said path. The movement of the leading body in said one direction is retarded at a fixed location adjacent to said point of discharge for a predetermined length of time, and it is then discharged from said path, and the next succeeding body, which is 33' in FIG. 3, is held for a predetermined length of time against the shoulder 30 (FIG. 6) until it falls into the next recess 31 and is discharged therefrom. This is repeated with each succeeding leading fruit body.

In the present method the fruit body moves, under the influence of gravity, out of the horizontally extending path, along a path that extends spirally relative to horizontally extending path.

Also, in the method it should be noted that the fruit bodies roll down the cylinder 4 on helically extending lines that are equally spaced from the axis of the cylinder 4, and their movement is retarded at the lower end of the cylinder, and thereafter the bodies are moved out of the device at equally spaced intervals along spirally extending lines of equal length.

Normally the fruit bodies are in engagement with each other in cylinder 4 before they reach the lower end, since they travel down the cylinder 4 at an accelerated rate of speed due to the faster rotation of cylinder 4, hence the successive bodies are in a position at the lower end of the cylinder for entering the pockets 31 at uniform intervals.

I claim:

1. A feeder for feeding rollable fruit bodies from a discharge point, one at a time, at equally spaced time intervals, comprising:

(a) fruit supporting means downwardly inclined relative to horizontal actuatable for movement for moving a plurality of said fruit bodies in engagement with each other substantially in single file longitudinally of said file in a downwardly inclined direction to a discharge point at the lower end of said supporting means, (b) actuating means connected with said fruit supporting means for actuating the latter for said movement thereof, (c) an open ended cylinder at said lower end of said fruit supporting means, (d) means supporting said cylinder inclined downwardly in the same direction as said fruit supporting means for rotation about its axis with the latter substantially parallel with said file and in a positions for receiving successive fruit bodies in one open end thereof from said fruit supporting means at the leading end of the file adapted to be supported and moved thereby, (e) circumferentially equally spaced fruit obstructing members rigid within said cylinder adapted to obstruct passage of each fruit body therein out of the other open end thereof with the spaces between said members sufficiently wide to pass each fruit body, (f) means connected with said cylinder for rotating the latter at a uniform rate of speed whereby a fruit body from said one end of said fruit supporting means will pass said members at uniform time intervals.

2. In a feeder as defined in claim 1, (g) deflector means adjacent to said other end of said cylinder extending transversely across each space for deflecting each body adapted to enter each space out of said other open end as said cylinder is rotated.

3. In a feeder as defined in claim 1, (g) each of said members being formed with a radially inwardly opening spiral channel extending from the inside of said cylinder at said other open end thereof out of said last mentioned end along which each fruit body entering each of said spaces is adapted to be guided and supported for movement out of said other open end upon rotation of said cylinder in one direction.

4. A feeder for feeding rollable fruit bodies from a discharge point, one at a time, at equally spaced time intervals, comprising:

(a) a generally horizontally extending open ended upper cylinder inclined relative to horizontal and supported for rotation about its axis, and through which such fruit bodies are adapted to roll in single file from the elevated end of said cylinder to the lower end thereof upon rotation of said cylinder in one direction, (b) means supporting said cylinder in said inclined position and for rotation about its said axis, (c) actuating means connected with said cylinder for so rotating it in said one direction at a uniform rate of speed, (d) a lower open ended cylinder at the lower end of said upper cylinder in extension of the latter, (e) means supporting said lower cylinder in a position for receiving a fruit body from the lower open end of said upper cylinder, and for rotation of said lower cylinder about its axis, (f) discharge means within said lower cylinder movable therewith to successive position intermittently obstructing passage of said fruit body therethrough from said one open end to the opposite open end thereof for predetermined uniform lengths of time and releasing such body for said movement to and out of said opposite open end, upon rotation of said lower cylinder, (g) means connecting said lower cylinder with said upper cylinder for rotation of said lower cylinder at a uniform rate of speed upon rotation of said upper cylinder, whereby said bodies will be released for discharge from said opposite end of said lower cylinder at uniform time intervals.

5. In a feeder as defined in claim 4, (h) said means connecting said lower cylinder with said upper cylinder being adapted to rotate said upper cylinder faster than said lower cylinder for ensuring delivery of fruit bodies from said upper cylinder into said lower cylinder for successive discharge from said lower cylinder at said uniform time intervals.

6. In a feeder as defined in claim 4, (h) said discharge means including separately extending channels relative to the axis of said lower cylinder for guiding each body along a separately extending path out of said opposite end of said lower cylinder between said intervals when said movement of said bodies through said lower cylinder is obstructed.

7. A feeder for feeding rollable fruit bodies from a discharge point, one at a time, at equally spaced time intervals, comprising:

(a) fruit supporting means inclined downwardly relative to horizontal actuatable for rotation for moving a plurality of said fruit bodies thereon and in engagement with each other substantially in single file longitudinally thereof in a downwardly inclined path of travel for discharge at the lower end of said fruit supporting means, said rotation being about an axis extending longitudinally of said path and file, (b) actuating means connected with said fruit supporting means for actuating the latter for said rotation thereof, (c) said fruit supporting means including a cylindrical lower end portion through which said path extends, (d) means within said cylindrical lower end portion rigidly carried by the walls thereof defining a radially inwardly opening spirally extending channel of a width for passing single fruit bodies from the leading end of said file therethrough one at a time upon and during said rotation, said channel having an open lower end at the lower end of said fruit supporting means for said discharge of fruit bodies, one at a time, from said channel and from said lower end of said fruit supporting means.

No references cited.

HUGO O. SCHULZ, *Primary Examiner.*